United States Patent [19]
Atkins

[11] 4,370,948
[45] Feb. 1, 1983

[54] NIPPLE WATERER

[76] Inventor: Robert C. Atkins, 4548 Eisenhower Ave., Alexandria, Va. 22304

[21] Appl. No.: 135,547

[22] Filed: Mar. 31, 1980

[51] Int. Cl.³ .............................................. A01K 7/00
[52] U.S. Cl. ..................................... 119/72.5; 119/75
[58] Field of Search ................... 119/72.5, 75; 138/40, 138/45, 46; 251/205, 207, 208, 352

[56] References Cited

U.S. PATENT DOCUMENTS 1,238,433  8/1917  Pedersen ............................. 251/208
2,878,836  3/1959  Binks .................................... 138/45
3,646,955  3/1972  Olde ..................................... 119/75
3,698,431  10/1972  Thompson ..................... 119/72.5 X
3,734,063  5/1973  Atchley ............................. 119/72.5

Primary Examiner—Hugh R. Chamblee
Attorney, Agent, or Firm—Brady, O'Boyle & Gates

[57] ABSTRACT

A nipple waterer having a tiltable spring biased valve, the valve seat being a plastic ring held in position by a stainless steel washer. The inlet to the nipple waterer having an adjustable orifice. The valve seat, valve, spring, and adjustable orifice being held in assembled relationship by a retaining ring connected to the inlet of the waterer.

5 Claims, 9 Drawing Figures

NIPPLE WATERER

BACKGROUND OF THE INVENTION

Various water-feeding devices for animals have been proposed which include a spring biased tiltable valve of the type shown in U.S. Pat. No. 3,646,955. While these known devices have been satisfactory for their intended purpose, they have been subject to certain disadvantages. For instance, in those devices having a plastic valve seat supported on a shoulder formed in the bore of the valve housing, it has been found that under freezing ambient conditions the device tends to expand resulting in the seat being dislodged from its operative position.

In those devices which included a removal orifice plate in the inlet portion to adapt the device to the actual water pressure, it was necessary to maintain a supply of various orifice plates which would be selectively mounted in the valve housing.

Furthermore, in order to disassemble the known watering devices, it was necessary to individually disconnect a plurality of the valve components from the valve housing.

To overcome the above-noted disadvantages in known animal water-feeding devices, the nipple waterer of the present invention has been devised which includes a stainless steel washer mounted in an annular groove formed in the bore of the valve housing adjacent the plastic valve seat whereby the seat is prevented from being dislodged during the expansion of the valve under freezing conditions. The inlet of the waterer is provided with an adjustable orifice to preclude the necessity of keeping a plurality of orifice plates on hand, and a retaining ring mounted in the inlet of the waterer holds the various components of the waterer in operative position so that when it is necessary to either clean or replace a component, the removal of the retaining ring permits the various components of the waterer to be easily removed from the valve housing.

DESCRIPTION OF THE PREFERRED EMBODIMENT

Figure 4:
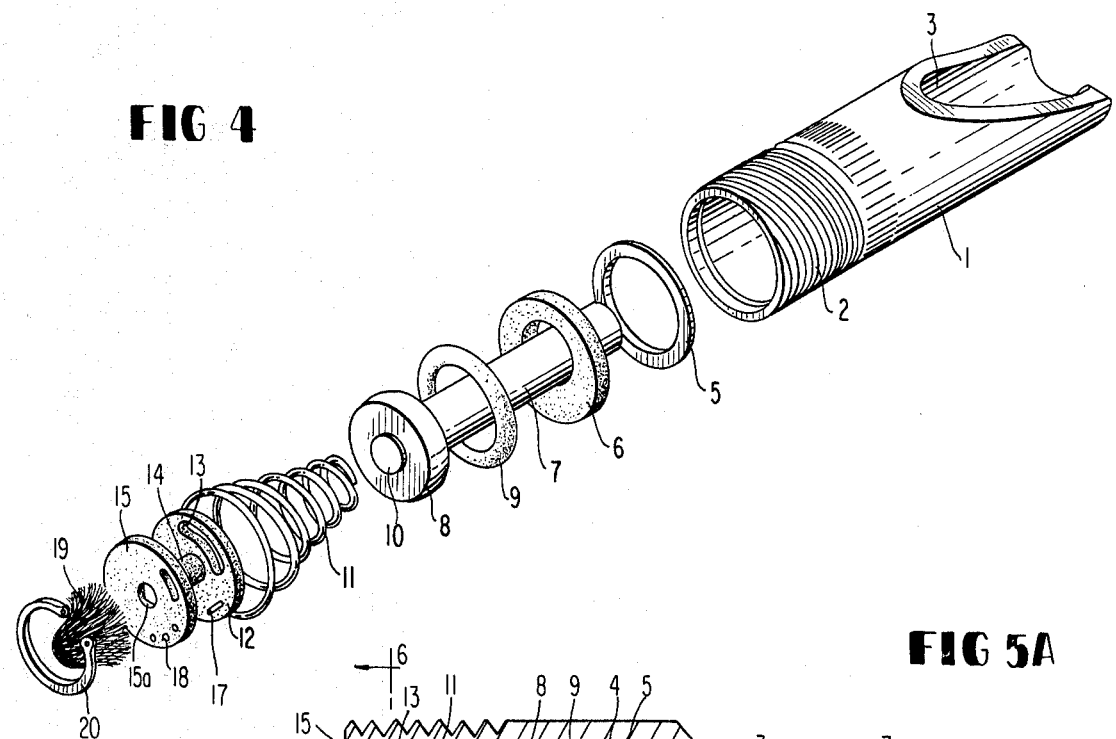
FIG. 4 is an exploded perspective view showing the various components of the waterer.
Figure 5A:
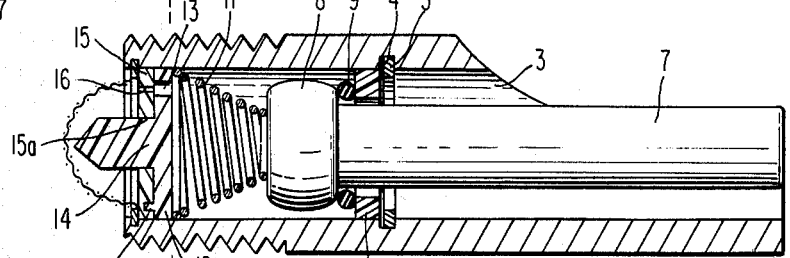
FIG. 5A is a side elevational view of the waterer, partly in section.
Figure 6A:
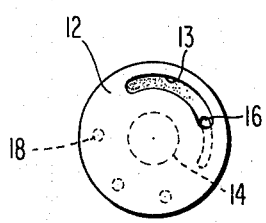
FIGS. 6A, 6B and 6C are views taken along line 6—6 of FIG. 5A showing the inlet orifice being adjusted from the partially open to the fully open position.
Figure 6B:
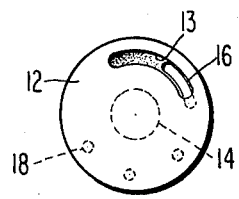
Figure 6C:
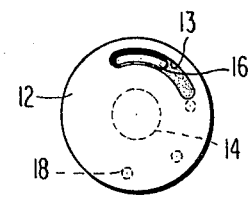

Referring to the drawings and more particularly to FIGS. 4 and 5A thereof, the nipple waterer of the present invention comprises a cylindrical sleeve or housing 1 having a threaded portion 2 at the inlet end thereof, and a beveled cutaway portion 3 formed on one side thereof at the outlet end. A groove 4 is formed in the bore of the sleeve for receiving a stainless steel washer 5 which supports a plastic ring 6 forming a valve seat. A valve stem 7 is positioned coaxially within the sleeve and extends through the washer 5 and ring 6. A valve head 8 is integrally connected to one end of the stem 7, and an O-ring 9 is mounted between the valve head 8 and the plastic ring 6. An embossment 10 is provided on the face of the valve head for receiving the smaller end of a helical compression spring 11, the larger end of the spring abutting one face of an adjustable orifice plate 12 having an arcuate orifice 13, the opposite face of the plate 12 having a stem 14 extending axially therefrom. A second orifice plate 15, having an arcuate orifice 16 communicating with orifice 13, is mounted in face-to-face engagement with the opposite face of plate 12, the stem 14 extending through a central aperture 15a provided in the plate 15. An axially extending locating pin 7 is provided on the plate 12 and is adapted to be positioned in a selected one of a plurality of apertures 18 formed in the plate 15. By this construction and arrangement, the plate 12 can be angularly adjusted relative to the plate 15, and by positioning the pin 17 in a desired opening 18, the size of the communicating aperture between the orifices 13 and 16 can be varied from a partial open position to a fully open position, as illustrated in FIGS. 6A, 6B and 6C.

To complete the construction of the nipple waterer of the present invention, a filter screen 19 is positioned in the water inlet end of the housing 1, and a resilient, split retaining ring 20 is mounted in a groove 21 formed in the bore of the housing for holding the components of the waterer in the assembled position as shown in FIG. 5A.

Figure 1:
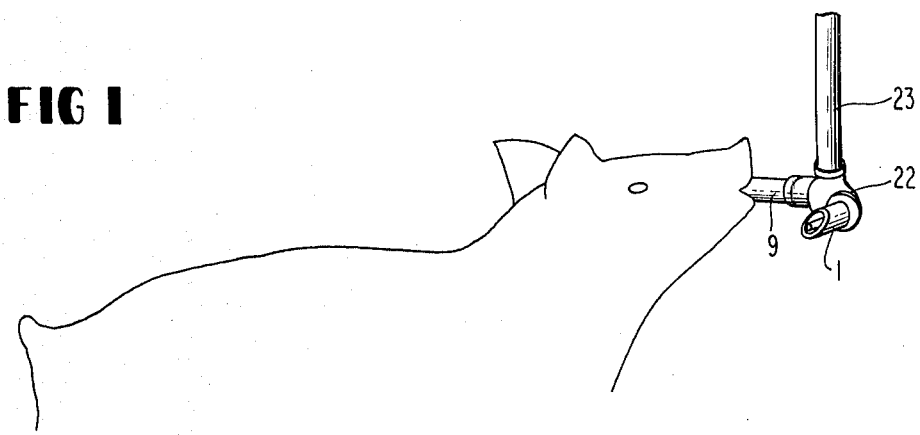
FIG. 1 is a perspective view of the nipple waterer of the present invention connected to a water supply pipe.
Figure 2:
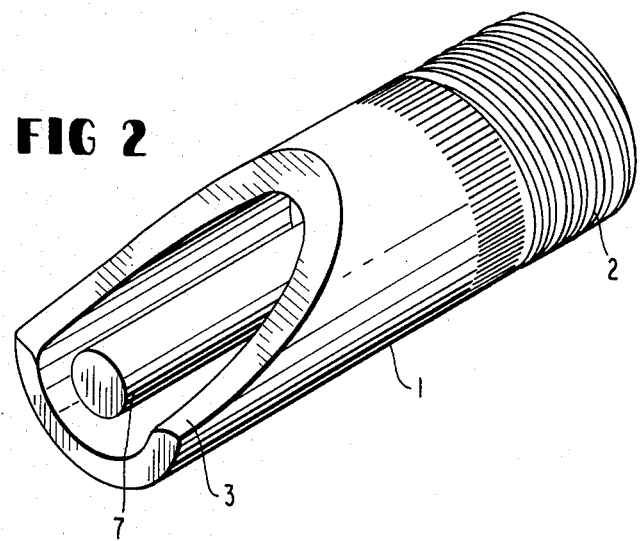
FIG. 2 is a perspective view of the waterer of the present invention showing the outlet thereof.
Figure 3:
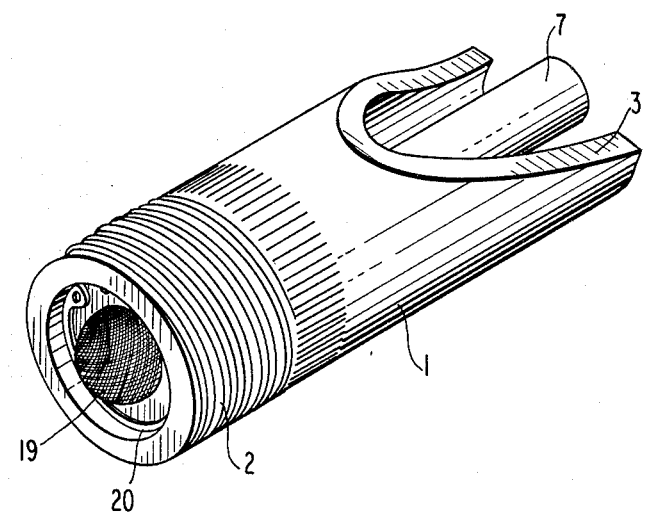
FIG. 3 is a perspective view of the waterer showing the inlet thereof.
Figure 5B:
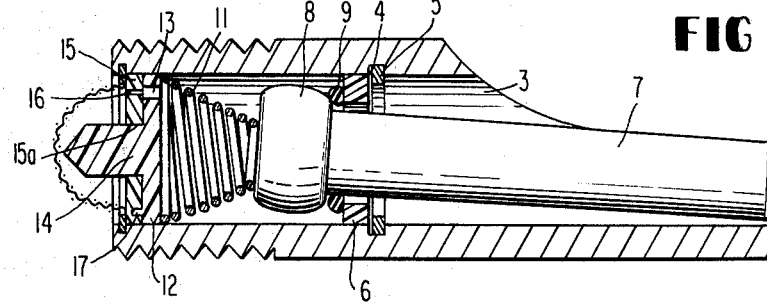
FIG. 5B is a view similar to FIG. 5A showing the valve tilted to the open position.

In use, the nipple waterer is connected to a Y-connection 22 mounted on the end of a water supply pipe 23, as shown in FIG. 1. When the animal to be watered inserts the nozzle into his mouth, the stem 7 is caused to tilt, as shown in FIG. 5B, thereby lifting the valve head 8 from the valve seat 6 to allow water to flow through the nipple.

When it is desired to either change the size of the aperture between the communicating orifices 13 and 16, or to disassemble the nipple for cleaning or replacing the components, it is only necessary to remove the retaining ring 20, to thereby allow the various components to be pulled out of the sleeve through the inlet end thereof. In this connection, it will be noted that the stem 14 provides a handle to facilitate pulling both orifice plates 12 and 15 out of the sleeve 1.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A nipple waterer comprising, a sleeve having an inlet end and an outlet end, a valve seat mounted in said sleeve intermediate the inlet and outlet ends, a valve head positioned on the inlet side of said seat, a stem integrally connected to said valve head and extending axially through said valve seat in a direction toward the outlet end of said sleeve, adjustable orifice means mounted in the inlet end of said sleeve; said adjustable orifice means comprising a first circular plate having an orifice therein, a second circular plate having an orifice therein, said plates being mounted in face-to-face relationship, said orifices being in communicating relationship to form an aperture therebetween, and means at the peripheral regions of said plates and extending therebetween for releasably holding the plates in an adjusted, angular relationship, whereby the size of the aperture may be varied, and a spring positioned between said adjustable orifice means and said valve head for biasing the valve head to the closed position against said seat.

2. A nipple waterer according to claim 1, wherein the means for releasably holding the plates in the adjusted position comprises a plurality of apertures provided in one of said plates, and a locating pin extending axially from a face of the other plate, said locating pin being insertable into a selected one of said apertures.

3. A nipple waterer according to claim 1, wherein a stem is connected to one of the plates, said stem extending axially from said plate through the other plate in a direction toward the sleeve inlet, whereby the stem provides a handle for pulling the orifice plates out of the sleeve when disassembling the waterer nipple for maintenance.

4. A nipple waterer according to claim 1, wherein the seat comprises a plastic ring, and a retaining ring mounted in a groove formed in the sleeve bore for holding the plastic ring in the operative position.

5. A nipple waterer according to claim 1, wherein a split, resilient, retaining ring is mounted in a groove in the bore of the sleeve at the inlet thereof, whereby the adjustable orifice means, spring, and valve are held in the operative position in said sleeve.

* * * * *